United States Patent [19]
Tomi et al.

[11] Patent Number: 5,627,696
[45] Date of Patent: May 6, 1997

[54] FORCED RECORDING MEDIUM CARTRIDGE UNLOADING SYSTEM FOR LIBRARY APPARATUS

[75] Inventors: Hideyuki Tomi; Noboru Osada, both of Kawasaki, Japan

[73] Assignee: Fujitsu Limited, Japan

[21] Appl. No.: 373,888

[22] Filed: Jan. 17, 1995

Related U.S. Application Data

[63] Continuation of Ser. No. 59,498, May 10, 1993, abandoned.

[30] Foreign Application Priority Data

May 12, 1992 [JP] Japan ................... 4-118792

[51] Int. Cl.$^6$ ................... G11B 15/68
[52] U.S. Cl. ................... 360/71; 360/92
[58] Field of Search ................... 360/71, 92

[56] References Cited

U.S. PATENT DOCUMENTS

| | | | |
|---|---|---|---|
| 4,779,151 | 10/1988 | Lind et al. | 360/92 |
| 4,864,438 | 9/1989 | Munro | 360/92 |
| 4,928,245 | 5/1990 | Moy et al. | 360/92 X |

FOREIGN PATENT DOCUMENTS

| | | |
|---|---|---|
| 2-187957 | 7/1990 | Japan . |
| 3-237522 | 10/1991 | Japan . |
| 3-225665 | 10/1991 | Japan ................... 360/92 |
| 3-260951 | 11/1991 | Japan . |
| 3-259451 | 11/1991 | Japan . |
| 3-121547 | 12/1991 | Japan . |
| 3-272049 | 12/1991 | Japan . |
| 4-92241 | 3/1992 | Japan . |
| 4-229451 | 8/1992 | Japan ................... 360/92 |

OTHER PUBLICATIONS

JP3–225665, Oct. 1991, Japan, Kosuge, English translation.

*Primary Examiner*—Aristotelis Psitos
*Assistant Examiner*—James L. Habermehl
*Attorney, Agent, or Firm*—Greer, Burns & Crain, Ltd.

[57] ABSTRACT

A forced recording medium cartridge unloading system for use with a library apparatus which is operatively connected to a plurality of host computers. Interposed between the host computers and the library apparatus is a library controller that supervises and controls the library apparatus. The library controller issues a forced recording medium cartridge unloading command in response to a key input or to a request from any one of the host computers. An accessor of the library apparatus upon receipt of the forced unloading command from the library controller in turn issues a forced recording medium cartridge unloading command to a recording medium drive unit that writes and reads data to and from the recording medium cartridge loaded therein. This causes the recording medium drive unit forcibly to unload the recording medium cartridge left loaded inadvertently therein.

6 Claims, 10 Drawing Sheets

FORCED RECORDING MEDIUM CARTRIDGE UNLOADING SYSTEM FOR LIBRARY APPARATUS

This is a continuation of application Ser. No. 08/059,498 filed on May 10, 1993 now abandoned.

BACKGROUND OF THE INVENTION

1. Field of the Invention

The present invention relates to a forced cartridge unloading system for use with a library apparatus including a recording medium drive unit, the system causing a recording medium cartridge to be forcibly unloaded from the drive unit.

2. Description of the Related Art

Magnetic tape units are one of diverse kinds of external storage devices for use with computers. The magnetic tape units operate most commonly on what is known as the open reel system using 0.5-inch wide tapes. The chores of manually loading the open reels have been alleviated by widening acceptance of automatic tape loading devices. Today, operators' burdens are further alleviated by the widespread use of magnetic tape cartridges. A magnetic tape cartridge, accommodating a tape having the same width as that of open reel tapes, allows the tape to be threaded out of the reel within for automatic tape loading.

A plurality of magnetic tape cartridges needed are entered in the magnetic tape library apparatus. Any one of the cartridges is selected and loaded to a magnetic tape drive unit for writing data to and from the cartridge. The magnetic tape library apparatus includes a cell unit having a plurality of cells each accommodating a magnetic tape cartridge; a magnetic tape drive unit for writing and reading data; and an accessor for automatically switching magnetic tape cartridges between the cell unit and magnetic tape drive unit. The magnetic tape library apparatus further includes a cartridge entry unit for entering magnetic cartridges into the library apparatus, and an automated cartridge ejection unit for automatically ejecting magnetic tape cartridges from the library apparatus. Magnetic tape library apparatuses of this kind are widely used as an external mass storage device for computers. These apparatuses are required to operate unfailingly when unattended.

The magnetic tape cartridge has a leader block attached to the tip of the magnetic tape it contains. In operation, a sled arm in the magnetic tape drive unit catches the leader block of the cartridge and attaches it to a machine reel in the drive unit. The magnetic tape drive unit then runs the tape for writing or reading data thereto or therefrom. The writing and the reading of data to and from the magnetic tape are accomplished by the magnetic tape drive unit using a director. The director is operatively connected to a host computer as well as to the magnetic tape drive unit.

The magnetic tape cartridges contained in the cell unit are selectively gripped one by one by the accessor and loaded into the magnetic tape drive unit. The magnetic tape cartridge to or from which the magnetic tape drive unit has finished writing or reading data is caught by the accessor and returned to that cell in the cell unit which has the address corresponding to the cartridge.

Before the magnetic tape cartridge is ejected from the magnetic tape drive unit, the entire tape is wound into the cartridge and the sled arm of the drive unit engages the leader block of the tape with a latch of the cartridge.

Where the magnetic tape library apparatus is shared by a plurality of host computers, the director controlling the magnetic tape drive unit for writing and reading data to and from the tape is connected to the multiple host computers. Any one of the host computers issues various commands that are input to the magnetic tape drive unit through the director. In this setup, it may happen that a magnetic tape cartridge is left unused in the magnetic tape drive unit not accessed by any of the host computers.

For example, a host computer using the magnetic tape drive unit may shut down, leaving the current cartridge unused in the drive unit. In that case, the information that that particular host computer has used the magnetic tape drive unit is erased due to the system shut down. It then becomes impossible to know which host computer was using the magnetic tape drive unit left loaded with the cartridge.

With the magnetic tape cartridge left in the magnetic tape drive unit, that drive unit cannot be used henceforth by any host computer. If it is desired to use that particular drive unit, any one of host computers must issue an unloading command thereto so that the cartridge inside will be unloaded. If one host computer issues an unloading command to the magnetic tape drive unit while another host computer is using that particular unit, damage can occur to the magnetic tape cartridge and/or to the magnetic tape drive unit. Given these conditions, logic arrangements need to be provided whereby the plurality of host computers connected to the magnetic tape library apparatus verify among themselves that the magnetic tape drive unit to be used is not accessed currently by any of them.

Conventionally, there is provided a primary host computer capable of supervising all host computers for their operating status so as to ensure the above-mentioned conflict-evading logic. The capabilities required of the host computers in this respect place heavy burdens on them, especially on the primary host computer. Such burdens in turn diminish the amount of work that would otherwise be accomplished by the host computers. When the cartridge is left in the magnetic tape drive unit, one of the host computers must issue an unloading command to get the cartridge unloaded. This is an additional burden to be borne by the host computers. Furthermore, unloading the cartridge in this manner takes time.

SUMMARY OF THE INVENTION

It is therefore an object of the present invention to provide a forced recording medium cartridge unloading system for use with a library apparatus supervised and controlled by a library controller, the unloading system causing the controller to issue a forced unload command to get the currently loaded cartridge unloaded, whereby the burdens on the host computers configured are alleviated and the operability of the library apparatus is enhanced.

In accordance with an aspect of the present invention, there is provided a forced recording medium cartridge unloading system for use with a library apparatus which is operatively connected to a host computer; the library apparatus comprising a cell unit having a plurality of cells each accommodating a recording medium cartridge, a recording medium drive unit for writing and reading data to and from any one of the recording medium cartridges, and an accessor for automatically switching recording medium cartridges between the cell unit and the recording medium drive unit; the forced recording medium cartridge unloading system comprising: detection means for detecting a recording medium cartridge left loaded in the recording medium drive unit despite the fact that the host computer is not using the recording medium drive unit, the detection means being operatively connected to the host computer and to the library apparatus; first means provided outside the library apparatus for issuing a forced recording medium cartridge unloading command in response to the detection by the detection means, the first means being operatively connected to the host computer and to the library apparatus; second means provided in the accessor for issuing a forced recording medium cartridge unloading command to the recording medium drive unit in response to the forced recording medium cartridge unloading command received from the first means, the second means being operatively connected to the recording medium drive unit and to the first means; and third means provided in the recording medium drive unit for unloading the recording medium cartridge from the drive unit upon receipt of the forced recording medium cartridge unloading command from the second means.

In a preferred structure according to the invention, the detection means and the first means are included in a library controller that supervises and controls the library apparatus. Preferably, key input means is connected to the library controller and the first means issues a forced unloading command in response to a forced unloading request from the key input means. Alternatively, the first means issues the forced unloading command in response to a forced unloading request from a host computer.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
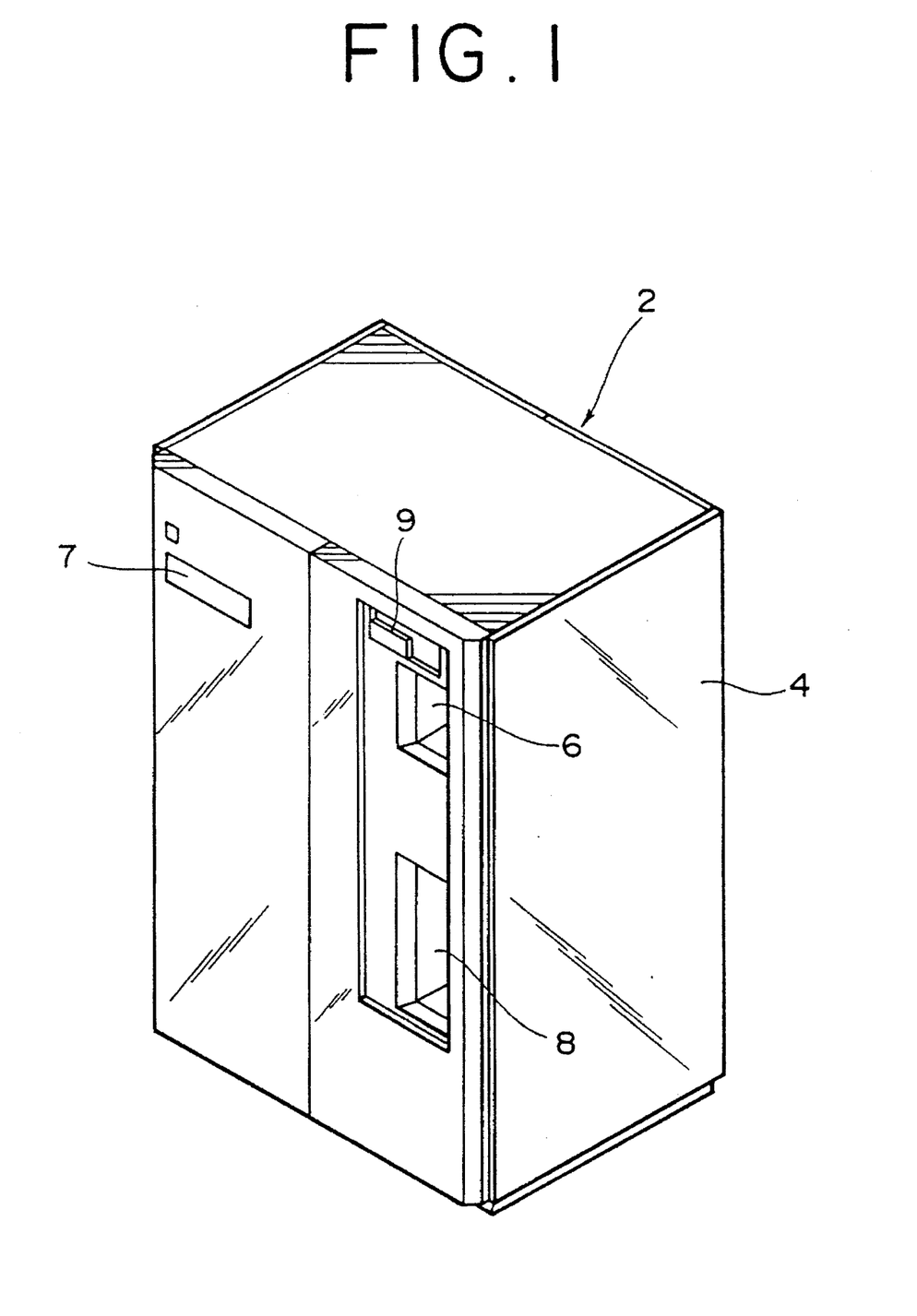
FIG. 1 is a front perspective view of a magnetic tape library apparatus to which the invention applies.
Figure 2:
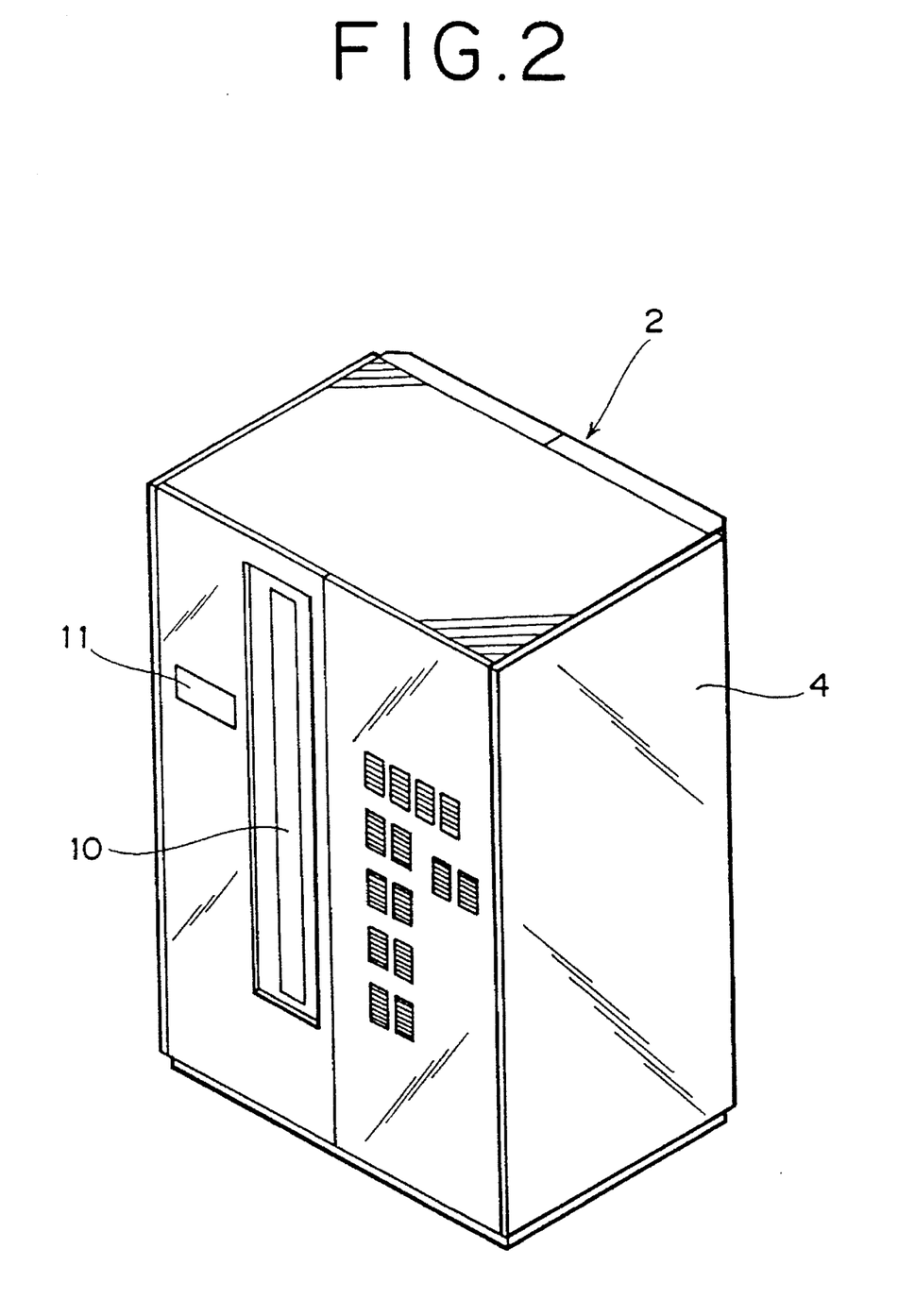
FIG. 2 is a rear perspective view of the magnetic tape library apparatus of FIG. 1.

FIGS. 1 and 2 are a front and a rear perspective view, respectively, of the magnetic tape library apparatus to which the invention applies. A housing 4 of the magnetic tape library apparatus 2 has at its front a cartridge entry opening 6, a cartridge exit opening 8 and operation panels 7 and 9. The cartridge entry opening 6 is capable of admitting up to, for example, 10 magnetic tape cartridges at a time. The cartridge exit opening 8 stacks up to, for example, 15 cartridges at a time. At the back of the housing 4 are an operation panel 11 and a mass cartridge entry/ejection mechanism 10 that places a large number of cartridges into a row of cells in a cell drum.

Figure 3:
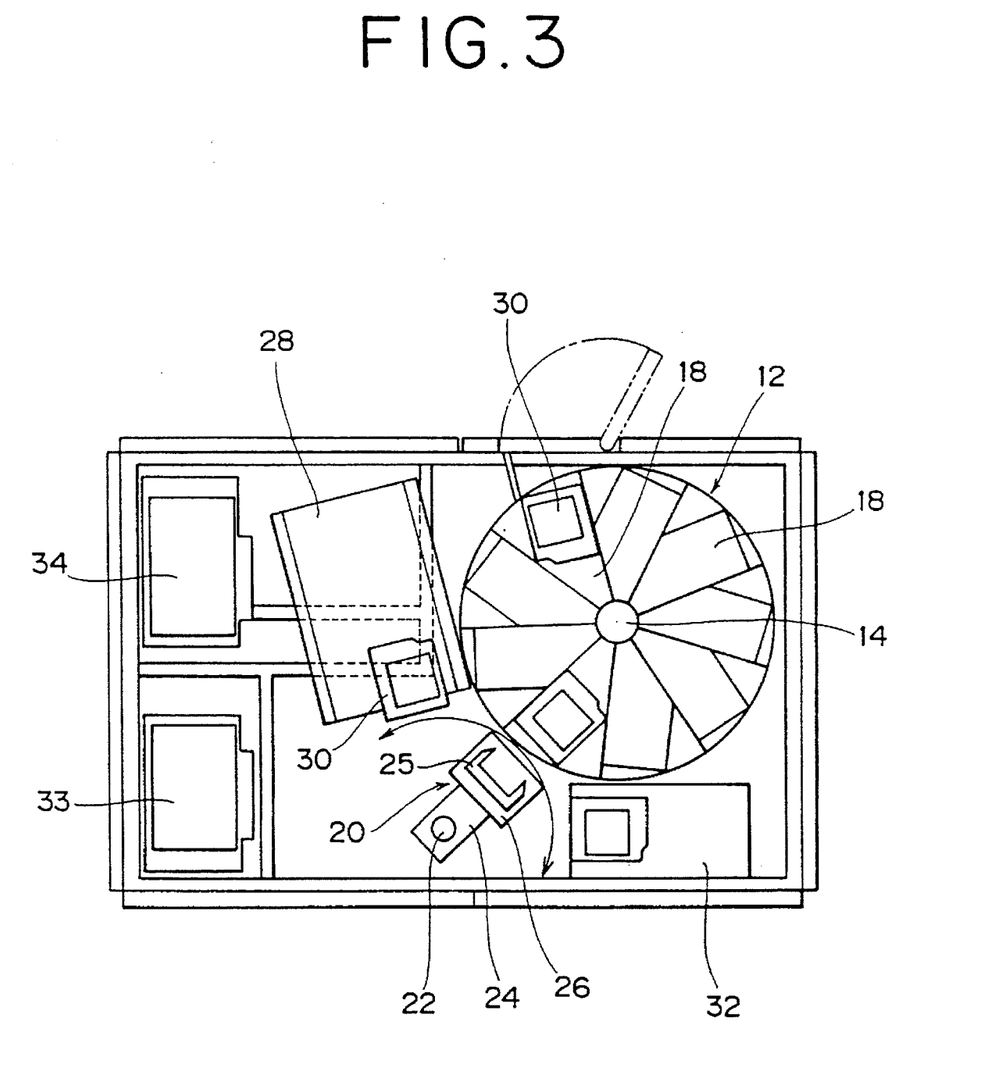
FIG. 3 is a schematic plan view of the magnetic tape library apparatus with a top plate of its housing removed.
Figure 4:
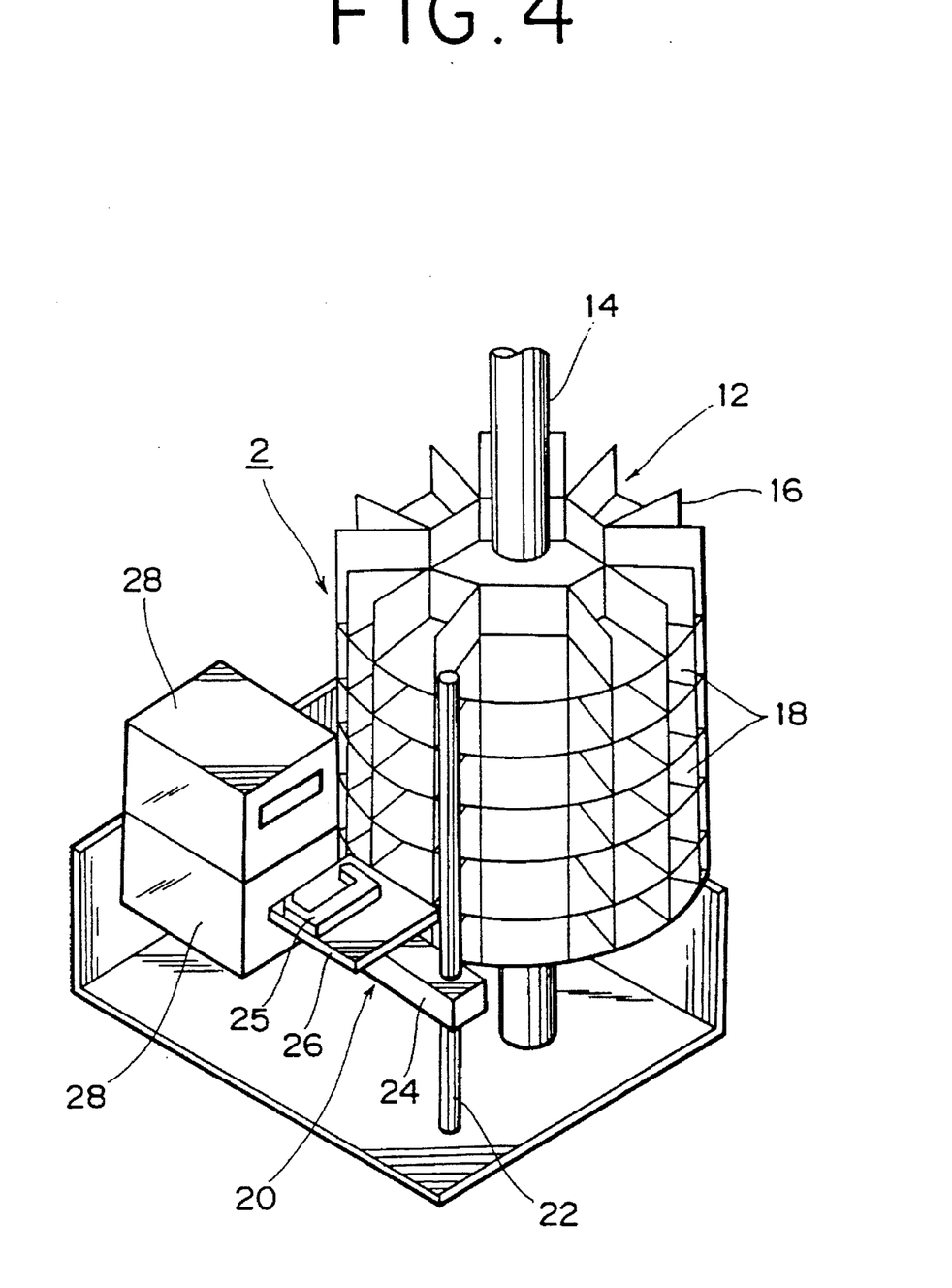
FIG. 4 is a schematic perspective view showing the inside of the magnetic tape library apparatus.

In FIGS. 3 and 4, a cell drum 12 is attached rotatably to a rotary shaft 14, the drum having a plurality of cells 18 separated by partitions 16. Adjacent to the cell drum 12 are two magnetic tape drive units 28 for writing and reading data to and from magnetic tapes. Between the cell drum 12 and the magnetic tape drive units 28 is an accessor 20 that automatically switches magnetic tape cartridges 30 therebetween. In FIG. 3, reference numeral 32 indicates a cartridge entry/ejection unit continued to the cartridge entry opening 6 and cartridge exit opening 8 of FIG. 1. An accessor controller 33 is provided to control the operation of the accessor 20, cell drum 12 and cartridge entry/ejection unit 32. A director 34 controls the magnetic tape drive units 28 in writing and reading data to and from the magnetic tape cartridges loaded therein.

Figure 5:
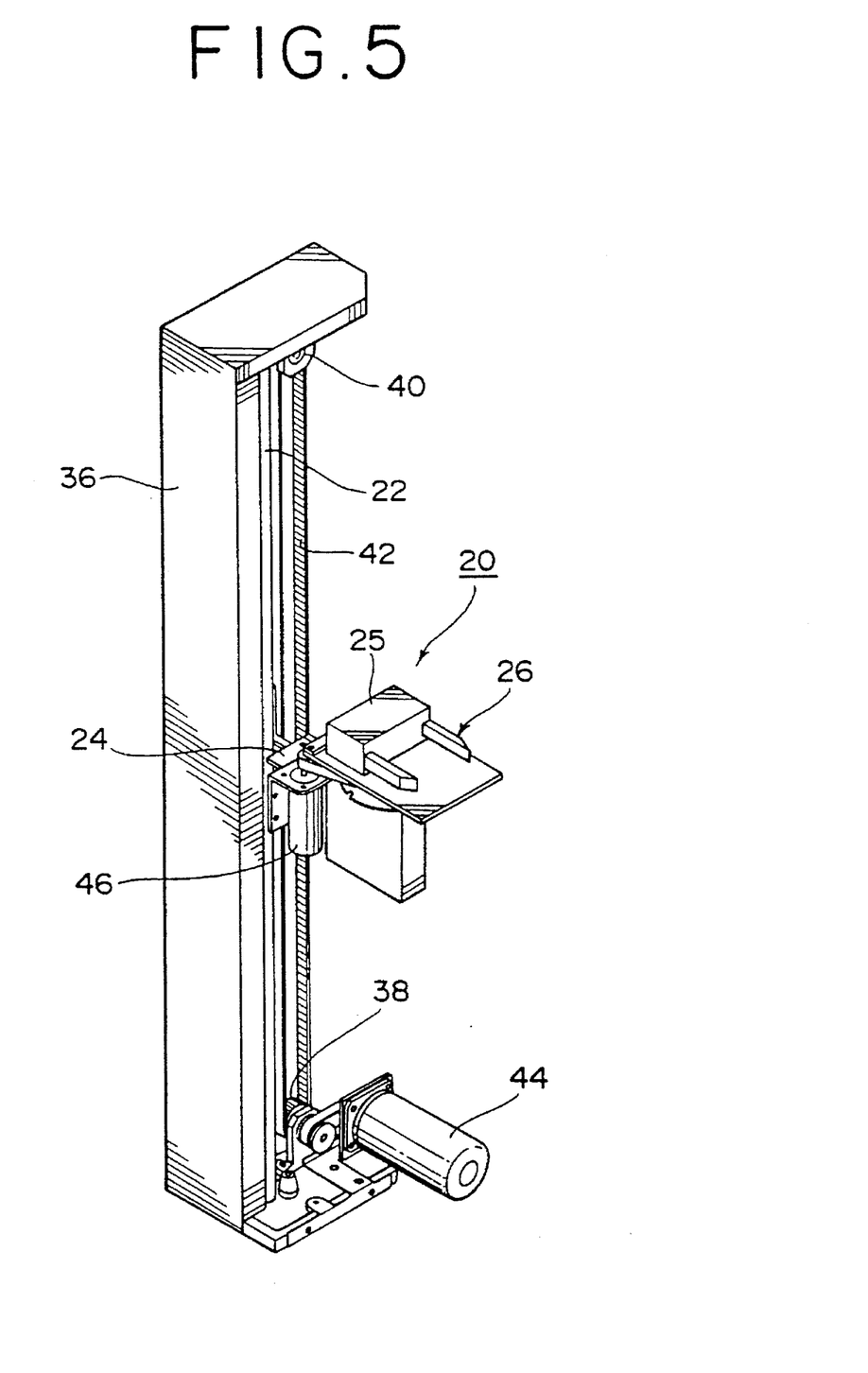
FIG. 5 is a schematic perspective view of an accessor drive mechanism as part of the magnetic tape library apparatus.

The driving mechanism of the accessor 20 is constructed as shown in FIG. 5. A driving pulley 38 and a driven pulley 40 are attached rotatably to an approximately C-shaped support member 36. A timing belt 42 is threaded around the pulleys 38 and 40 in an endless manner. The C-shaped support member 36 is secured with a guide member 22 extending perpendicularly. Another support member 24 is fixed to the timing belt 42. One end of the support member 24 is engaged with the guide member 22. A hand mechanism 26 with a grip hand 25 is mounted on the support member 24.

When a motor 44 is activated, the support member 24 fixed to the timing belt 42 moves up and down, guided by the guide member 22. That in turn moves vertically the hand mechanism 26 mounted on the support member 24. When a motor 46 is activated, the support member 24 swings horizontally, with the guide member 22 acting as the center of the swing motion. That is, the hand mechanism 26 also swings horizontally. Where the motors 44 and 46 are activated selectively under appropriate control, the hand mechanism 26 is led to gain access to a selected cell 18 in the cell drum 12 as well as to a selected magnetic tape drive unit 28.

The drive mechanism of the accessor 20 is appreciably simplified because it is composed only of the above-described vertical direction driving mechanism and of the swing mechanism centering on the guide member. 22. In practice, the cell drum 12, magnetic tape drive units 28 and cartridge entry/ejection unit 32 are located around the accessor 20 in such a manner that largely the swing motion of the accessor 20 alone (along with a limited vertical movement) will effect delivery of magnetic tape cartridges among these components.

Figure 6:
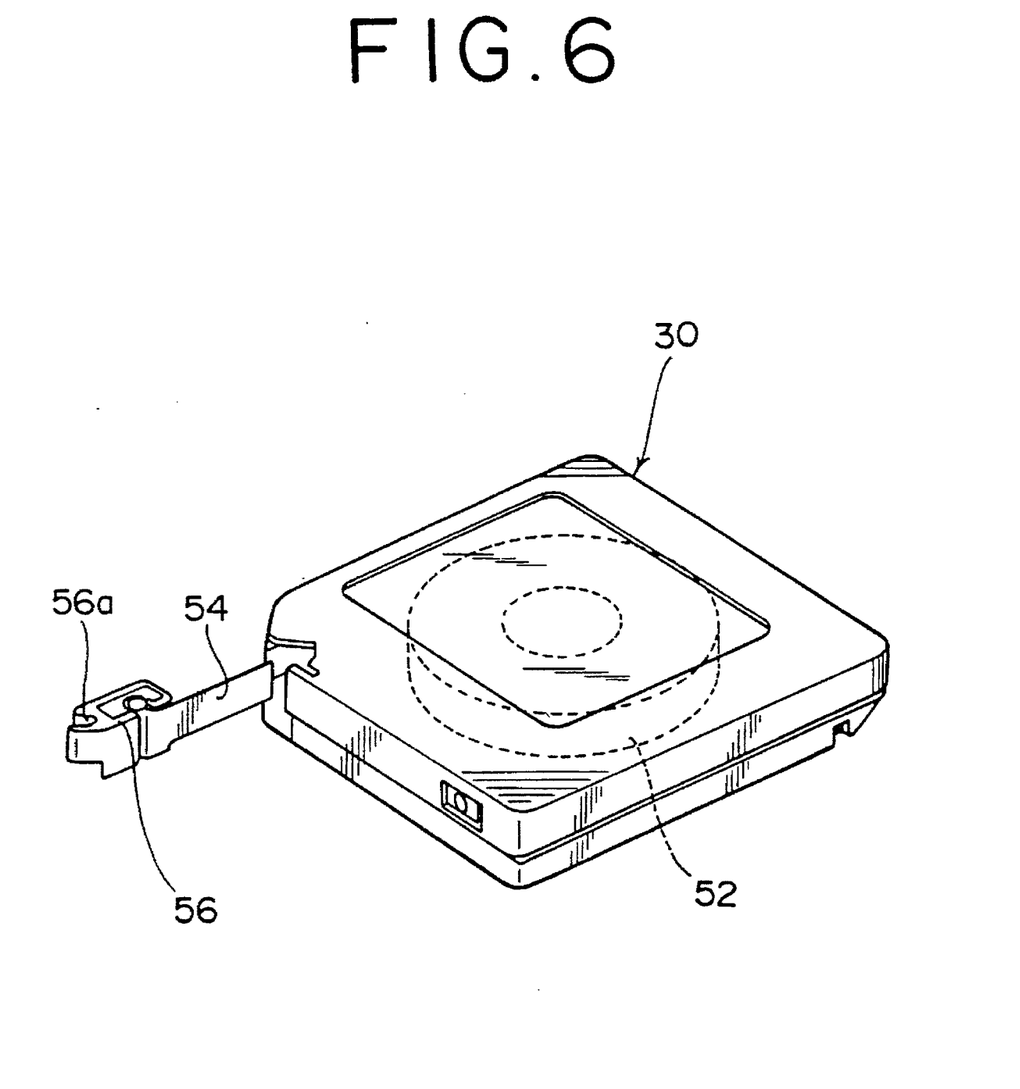
FIG. 6 is an external perspective view of a magnetic tape cartridge for use with the magnetic tape library apparatus.

Referring to FIG. 6, a tape reel 52 is housed rotatably inside a magnetic tape cartridge 30. The base of a magnetic tape 54 is secured to the tape reel 52, and the intermediate tape portion starting from the base is wound around the reel 52. The tip of the magnetic tape 54 is equipped fixedly with a leader block 56. The leader block 56 has an engagement groove 56a with which a sled pin of the magnetic tape drive unit 28 is to be engaged, as will be described later in more detail.

Figure 7:
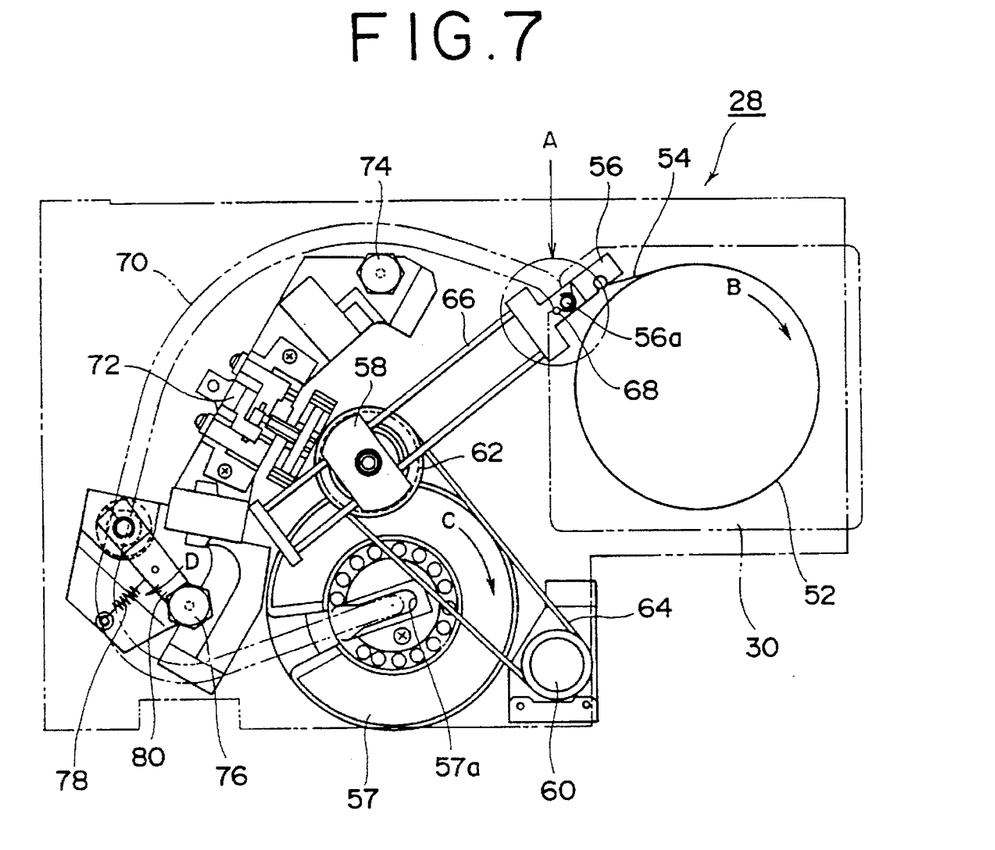
FIG. 7 is a plan view of a magnetic tape drive unit as part of the magnetic tape library apparatus, with phantom lines indicating the housing of the unit.

The constitution and the operation of the magnetic tape drive unit 28 will now be described with reference to FIG.

7. When the cartridge 30 is inserted into the magnetic tape drive unit 28, the tape reel 52 within the cartridge is rotated in the arrowed direction B by a drive motor, not shown. The rotation applies back tension to the magnetic tape 54. A machine reel 57, which takes up the magnetic tape 54, is arranged to be rotated in the arrowed direction C by a drive motor, also not shown.

Figure 8:
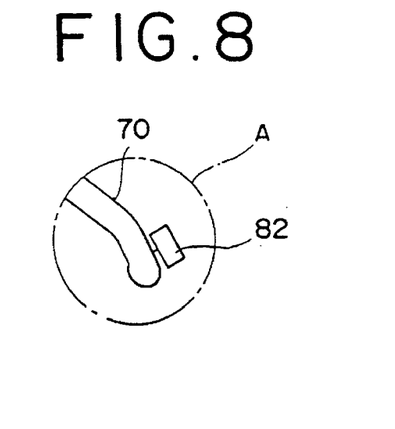
FIG. 8 is an enlarged view of part A in FIG. 7.

A holding member 58 is attached rotatably to the approximate center of the magnetic tape drive unit 28. The holding member 58 is rotated by a motor 60 via a belt 64 and a pulley 62. A sled arm 66 is attached slidingly to the holding member 58. The tip of the sled arm 66 has a sled pin 68 for engaging with the engagement groove 56a of the leader block 56. A slider, not shown, is attached to the tip of the sled arm 66 on the side opposite to the projecting direction of the sled pin 68. The slider is engaged with a guide 70 formed on the base of the magnetic tape drive unit 28. The guide 70 guides the sled pin 68 up to the machine reel 57. A magnetic head 72 writes and reads data to and from the magnetic tape 54. Guide rollers 74 and 76 for contacting the magnetic tape 54 are provided rotatably on both sides of the magnetic head 72. The guide roller 76 is attached to the tip of an arm 80 biased by a spring 78 in the arrowed direction D. The guide roller 76 thus applies tension to the magnetic tape 54. As shown in FIG. 8, a sensor 82 is provided adjacent to the tip of the guide 70. The sensor 82 checks to see if the leader block 56 of the cartridge 30 is in its normally engaged position.

In operation, the cartridge 30 is first inserted into the magnetic tape drive unit 28 by the hand mechanism 26 of the accessor 20, and the motor 60 is activated. This causes the sled arm 66 to rotate clockwise, engaging the sled pin 68 with the engagement groove 56a of the leader block 56 belonging to the cartridge 30. With the engagement completed, the motor 60 is turned counterclockwise so that the sled arm 66 will rotate in the same direction. This moves the slider along the guide 70 until the leader block 56 engages with the engagement groove 57a of the machine reel 57. When the machine reel 57 rotates in the arrowed direction C, the magnetic tape 54 is taken up by the reel 57 through sliding contact with the guide roller 74, magnetic head 72 and guide roller 76. While in contact with the magnetic tape 54, the magnetic head 72 writes or reads data thereto or therefrom.

After the data read/write operation on the magnetic tape 54, the tape reel 52 is rotated in the arrowed direction B so that the magnetic tape 54 will be rewound into the cartridge 30. With the magnetic tape 54 completely rewound, the grip hand 25 again takes hold of the cartridge 30 and brings it back to the appropriate cell in the cell drum 12.

Figure 9:
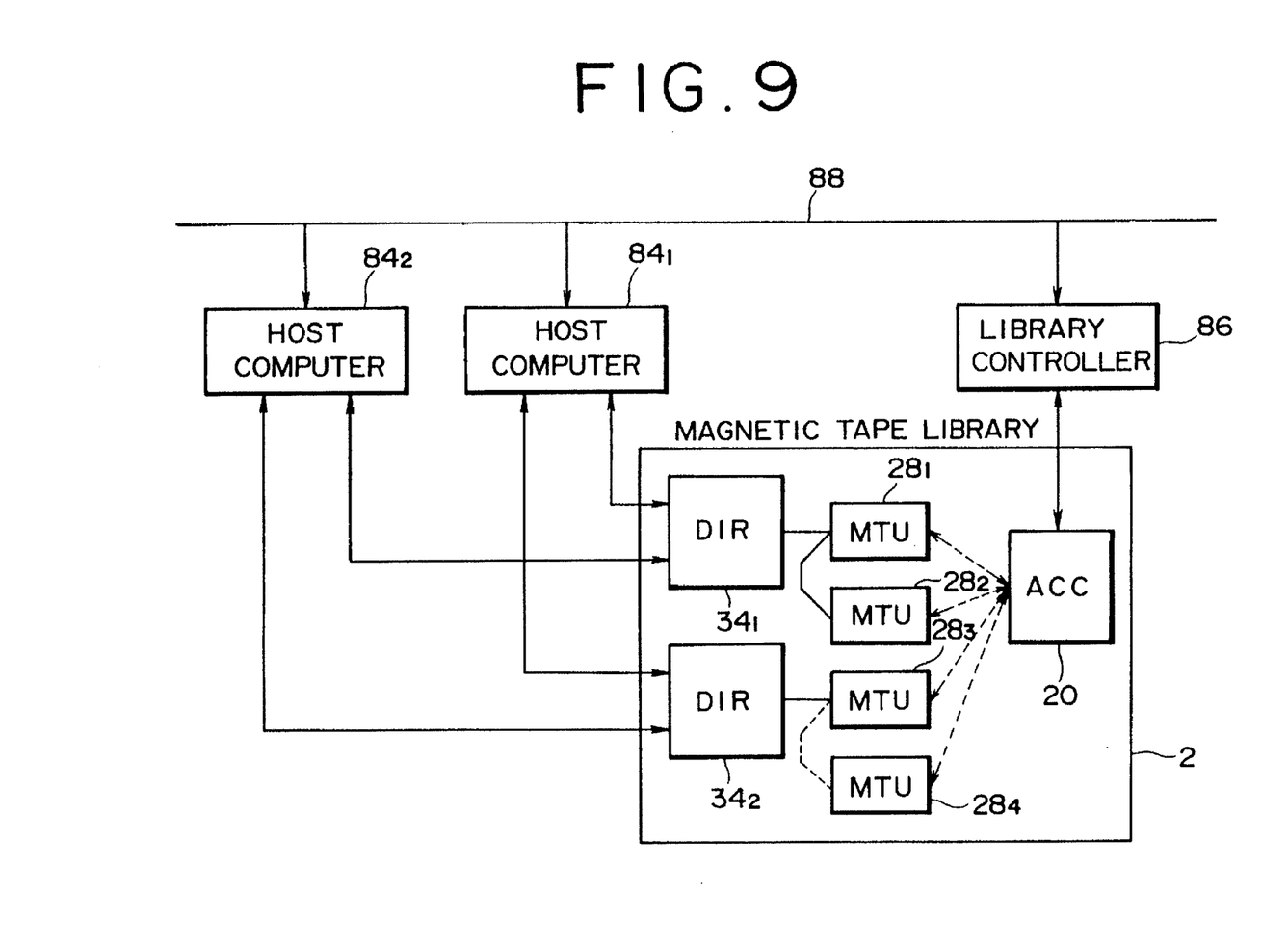
FIG. 9 is a block diagram depicting a connection of host computers to which the invention applies and the magnetic tape library apparatus, to which the invention applies.

FIG. 9 is a block diagram that outlines the constitution of a computer system to which the forced magnetic tape cartridge unloading system of the invention applies. Reference numeral 86 indicates a library controller which, composed illustratively of a workstation, supervises and controls the magnetic tape library apparatus 2. The library controller 86 is connected via communication lines 88 such as a local area network (LAN) to two host computers $84_1$ and $84_2$. The host computers $84_1$ and $84_2$ are connected to directors $34_1$ and $34_2$ of the magnetic tape library apparatus 2. The data read by magnetic tape drive units $28_1$ through $28_4$ are admitted via the directors $34_1$ and $34_2$ into the host computers $84_1$ and $84_2$ for processing. The data from the host computers $84_1$ and $84_2$ are input through the directors $34_1$ and $34_2$ to the magnetic tape drive units $28_1$ through $28_4$ for writing to the magnetic tape cartridges loaded therein.

The library controller 86 has in its data files information about the magnetic tape cartridges entered in the magnetic tape library apparatus 2, and keeps a constant watch on which of the host computers $84_1$ and $84_2$ is currently using which of the magnetic tape drive units $28_1$ through $28_4$. Illustratively, if the host computer $84_1$ wants to access one of the magnetic tape drive units $28_1$ through $28_4$, the host computer $84_1$ sends a use request to the library controller 86 over the communication lines 88. The library controller 86, which keeps a constant watch on which of the magnetic tape drive units $28_1$ through $28_4$ are currently out of use, returns to the host computer $84_1$ permission to use, say, the magnetic tape drive unit $28_2$. In response, the host computer $84_1$ notifies the library controller 86 of the magnetic tape cartridge that it wants to access. The library controller 86 issues to the accessor 20 a command ordering it to load the designated magnetic tape cartridge into the magnetic tape drive unit $28_2$. On receiving the command, the accessor 20 takes out the magnetic tape cartridge in question from the appropriate cell 18 of the cell drum 12 and loads the cartridge into the magnetic tape drive unit $28_2$. This allows the host computer $84_1$ to obtain, through the director $34_1$, the data read by the magnetic tape drive unit $28_2$ and to write necessary data to the magnetic tape cartridge through the magnetic tape drive unit $28_2$.

Figure 10:
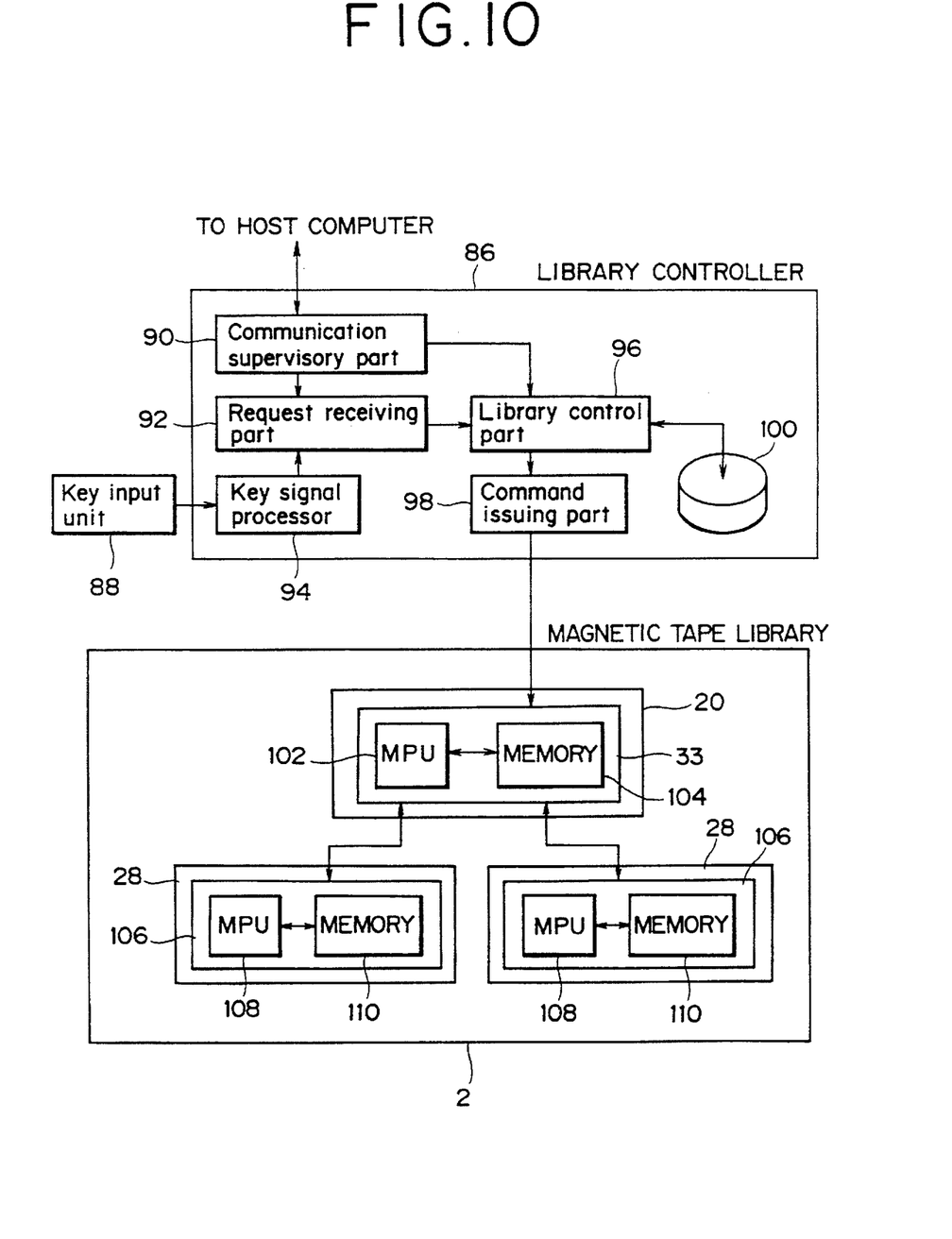
FIG. 10 is a block diagram of a forced magnetic tape cartridge unloading system embodying the invention.
Figure 11:
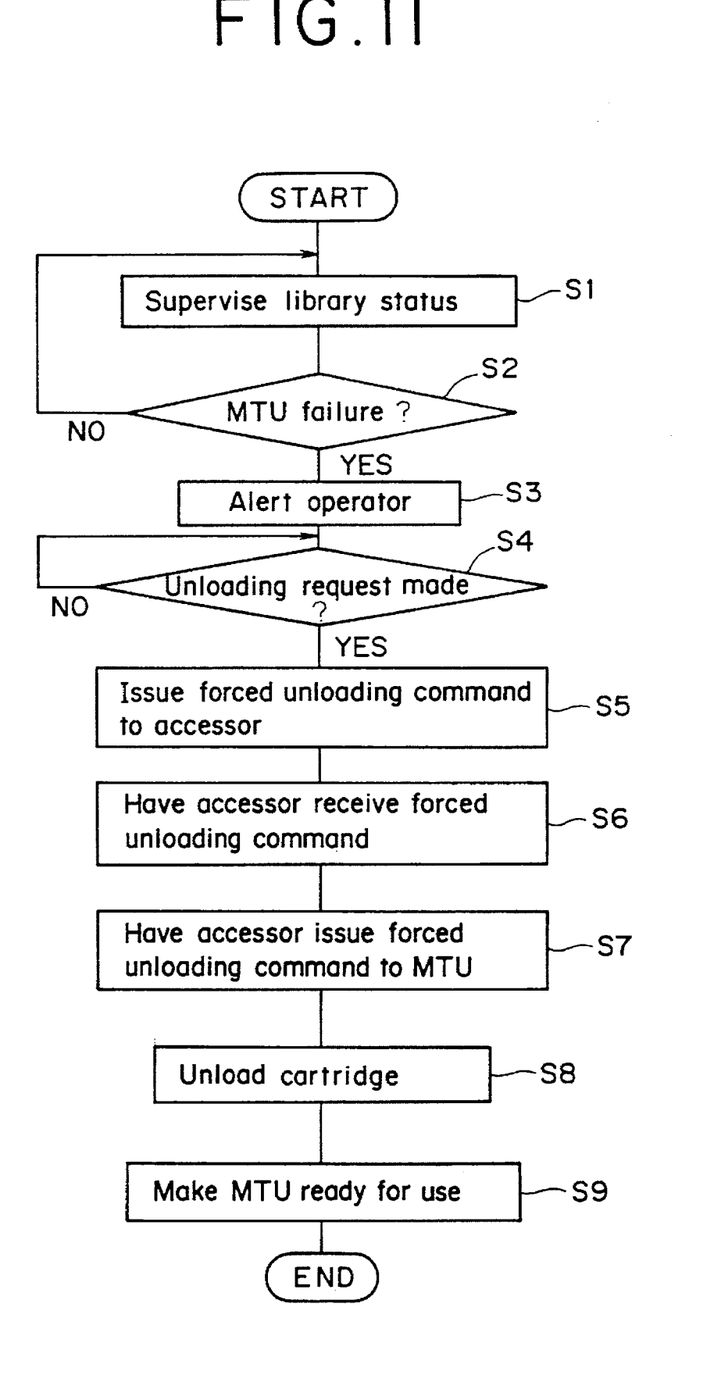
FIG. 11 is a flowchart of steps in which the embodiment of FIG. 10 illustratively works.

Described below with reference to FIGS. 10 and 11 are the constitution and the operation of a forced magnetic tape cartridge unloading system embodying the invention. This system permits forced unloading of the magnetic tape cartridge left loaded in any one of the magnetic tape drive units $28_1$ through $28_4$ for some reasons including a system down of one of the host computers $84_1$ and $84_2$.

Referring to FIG. 10, a key input unit 88 is connected to the library controller 86. A communication supervisory part 90 supervises information coming from the host computers $84_1$ and $84_2$. If any one host computer sends in a forced unloading request, the communication supervisory part 90 forwards that request to a request receiving part 92. A key signal processor 94 admits and processes a key signal from the key input unit 88 before forwarding that signal to the request receiving part 92.

Upon receipt of the forced unloading request, the request receiving part 92 forwards that request immediately to a library control part 96. The library control part 96 is intended to manage a library control data file 100 and to provide various kinds of supervision and control over the magnetic tape library apparatus 2. For example, the library control part 96 develops in memory the information about the internal status of the magnetic tape library apparatus 2 and particularly about which host computer is using which magnetic tape drive unit. Using that information, the library control part 96 provides diverse kinds of control over the magnetic tape library apparatus 2 by supervising its status dynamically. On receiving the forced unloading request from the request receiving part 92, the library control part 96 orders a command issuing part 98 to issue a forced unloading command.

A library control data file 100 stores information about the magnetic tape cartridges entered into the magnetic tape library apparatus 2. The library control data file 100 also accommodates various kinds of information gathered by the library controller 86 from the outside via communication lines. The command issuing part 98 issues to the accessor 20 a forced unloading command directed at the magnetic tape drive unit designated by the library control part 96. The functional parts 90 through 98 above are established in memory by loading predetermined programs thereto when the library controller 86 is turned on.

The accessor controller 33, composed of a microprocessing unit (MPU) 102 and a memory 104, controls the accessor 20, cell drum 12 and cartridge entry/ejection unit 32. The functions for controlling these units are implemented by loading predetermined programs into the memory 104. The accessor controller 33 has a command processing function for processing commands that are issued by the command issuing part 98. The command processing function of the accessor controller 33 receives the forced unloading command from the command issuing part 98 and issues accordingly its forced unloading command to the designated magnetic tape drive unit 28.

A controller 106 for each magnetic tape drive unit 28 contains an MPU 108 and a memory 110. With the controller 106, various functions for controlling the magnetic tape drive units 28 including the function for responding to the forced unloading command from the accessor 20 are implemented by loading predetermined programs into the memory 110.

How the above-described embodiment works will now be described with reference to the flowchart of FIG. 11. When the library controller 86 is turned on, step S1 is first entered. In step S1, the library controller 86 supervises the status of the magnetic tape library apparatus 2. In step S2, a check is made to see if a magnetic tape cartridge is left loaded in any one of the magnetic tape drive units 28 despite the fact that none of the host computers is known to have used that drive unit. If such a magnetic tape drive unit failure is detected, step S3 is reached. In step S3, the library control part 96 orders the library controller 86 to display an error message on a console, not shown, to alert the operator. Alternatively, a warning lamp or a buzzer may be activated to draw the operator's attention.

In step S4, a check is made to see if the operator, having noticed the error message, inputs a forced unloading request in the form of a key signal from the key input unit 88. The key signal, if entered, is processed by the key signal processor 94 before being forwarded to the request receiving part 92. Alternatively, any one host computer may issue a forced unloading request that is detected by the communication supervisory part 90 and sent to the request receiving part 92.

When the forced unloading request is entered either from the key input unit 88 or from any one of the host computers, the request receiving part 92 notifies the library control part 96 of that request. In response to the forced unloading request, the library control part 96 orders the command issuing part 98 to issue a forced unloading command. Given that order, in step S5, the command issuing part 98 of the library controller 86 issues its forced unloading command to the accessor 20. The processes in steps S1 through S5 are carried out within the library controller 86.

In step S6, the accessor 20 receives the forced unloading command from the command issuing part 98. Then a processing function preprogrammed in the accessor controller 33 analyzes the forced unloading command received. In step S7, the accessor 20 issues its forced unloading command directed at the designated magnetic tape drive unit 28. The forced unloading command thus issued is analyzed by a particular function preprogrammed in the controller 106 of each magnetic tape drive unit 28. Accordingly, in step S8, the magnetic tape cartridge left loaded in the designated magnetic tape drive unit 28 is forcibly unloaded therefrom. In step S9, the accessor 20 moves the unloaded magnetic tape cartridge 30 into the applicable cell 18 in the cell drum 12, setting the magnetic tape drive unit 28 free for use.

As described, the library controller according to the invention permits forced unloading of the magnetic tape cartridge from any magnetic tape drive unit independently of host computer control. Unlike conventional arrangements, there is no need for any host computer to issue a command for getting the magnetic tape cartridge forcibly unloaded. This provides significant reductions in the operating burden on the host computers configured. The forced unloading command is issued in response to the request either from the key input unit or from any of the host computers. That is, forced unloading of the magnetic tape cartridge is carried out either manually or automatically, which is a key feature that makes the system of the invention convenient and practical.

Although the description above contains many specificities, these should not be construed as limiting the scope of the invention but as merely providing illustrations of the presently preferred embodiment of the invention. For example, the invention may be applied not only to magnetic tape library apparatuses but also to library apparatuses dealing with other cartridge-type recording media including optical discs.

Thus the scope of the invention should be determined by the appended claims and their legal equivalents, rather than by the examples given.

What is claimed is:

1. A forced recording medium cartridge unloading system use with a library apparatus which is operatively coupled to a host computer, wherein the library apparatus includes a cell unit having a plurality of cells each accommodating a recording medium cartridge, a recording medium drive unit for writing and reading data to and from any one of the recording medium cartridges, and an accessor for automatically switching recording medium cartridges between the cell unit and the recording medium drive unit; the forced recording medium cartridge unloading system comprising:

a library controller, operatively coupled to the host computer and the library apparatus, for detecting a recording medium cartridge left loaded in the recording medium drive unit despite the fact that the host computer is not using the recording medium drive unit and for issuing a forced recording medium cartridge unloading command in response to the detection;

wherein said library controller issues said forced recording medium cartridge unloading command in response to a forced unloading request from the host computer;

means, provided in the accessor and operatively coupled to said recording medium drive unit and to said library controller, for issuing a forced recording medium cartridge unloading command to the recording medium drive unit in response to the forced recording medium cartridge unloading command received from said library controller; and means, provided in the recording medium drive unit, for unloading the recording medium cartridge from the drive unit upon receipt of the forced recording medium cartridge unloading command from said means for issuing a forced recording medium cartridge unloading command to the recording medium drive unit.

2. A forced recording medium cartridge unloading system according to claim 1, further comprising key input means connected to said library controller, said library controller issuing the forced recording medium cartridge unloading command in response to a forced unloading request from said key input means.

3. A forced recording medium cartridge unloading system according to claim 1, further comprising a director operatively connected between said host computer and said recording medium drive unit, said director controlling said recording medium drive unit in writing and reading of data to and from the recording medium cartridge loaded in the drive unit.

4. A forced recording medium cartridge unloading system for use with a library apparatus which is operatively coupled to a plurality of host computers, the library apparatus including a cell unit having a plurality of cells each accommodating a recording medium cartridge, a recording medium drive unit for writing and reading data to and from any one of the recording medium cartridges, and an accessor for automatically switching recording medium cartridges between the cell unit and the recording medium drive unit; the forced recording medium cartridge unloading system comprising:

a library controller, operatively coupled to the host computer and the library apparatus, for detecting a recording medium cartridge left loaded in the recording medium drive unit despite the fact that none of the plurality of host computers is using the recording medium drive unit and for issuing a forced recording medium cartridge unloading command in response to the detection;

wherein said library controller issues said forced recording medium cartridge unloading command in response to a forced unloading request from one of the plurality of host computers;

means, provided in the accessor and operatively coupled to said recording medium drive unit and to said library controller, for issuing a forced recording medium cartridge unloading command to said recording medium drive unit in response to the forced recording medium cartridge unloading command received from said library controller; and     means, provided in the recording medium drive unit, for unloading the recording medium cartridge from the drive unit upon receipt of the forced recording medium cartridge unloading command from said means for issuing a forced recording medium cartridge unloading command to the recording medium drive unit.

5. A library apparatus system including a library apparatus operatively connected to a host computer, said system comprising:

a cell unit provided in said library, apparatus having a plurality of cells each accommodating a recording medium cartridge;

a recording medium drive unit provided in said library apparatus for writing and reading data to and from any one of said recording medium cartridges;

an accessor provided in said library apparatus for automatically switching recording medium cartridges between said cell unit and said recording medium drive unit;

a library controller, operatively coupled to said host computer and the library apparatus, for detecting a recording medium cartridge left loaded in said recording medium drive unit despite the fact that said host computer is not using said recording medium drive unit and for issuing a forced recording medium cartridge unloading command in response to the detection;

wherein said library controller issues said forced recording medium cartridge unloading command in response to a forced unloading request from the host computer;

means, provided in said accessor and operatively coupled to said recording medium drive unit and to said library controller, for issuing a forced recording medium cartridge unloading command to said recording medium drive unit in response to the forced recording medium cartridge unloading command received from said library controller; and     means, provided in said recording medium drive unit, for unloading the recording medium cartridge from the drive unit upon receipt of the forced recording medium cartridge unloading command from said means for issuing a forced recording medium cartridge unloading command to the recording medium drive unit.

6. A library apparatus system including a library apparatus operatively connected to a host computer, said system comprising:

a cell unit provided in said library apparatus having a plurality of cells each accommodating a recording medium cartridge;

a recording medium drive unit provided in said library apparatus for writing and reading data to and from any one of said recording medium cartridges;

an accessor provided in said library apparatus for automatically switching recording medium cartridges between said cell unit and said recording medium drive unit;

a library controller, operatively coupled to said host computer and the library apparatus, for detecting a recording medium cartridge left loaded in said recording medium drive unit despite the fact that said host computer is not using said recording medium drive unit and for issuing a forced recording medium cartridge unloading command in response to the detection;

wherein said library controller issues said forced recording medium cartridge unloading command in response to a forced unloading request from the host computer;

means, provided in said accessor and operatively coupled to said recording medium drive unit and to said library, controller, for issuing a forced recording medium cartridge unloading command to said recording medium drive unit in response to the forced recording medium cartridge unloading command received from said library controller;

means, provided in said recording medium drive unit, for unloading the recording medium cartridge from the drive unit upon receipt of the forced recording medium cartridge unloading command from said means for issuing a forced recording medium cartridge unloading command to the recording medium drive unit;

said library controller being operatively connected to said host computer and to said library apparatus for supervision and control of said library apparatus; and     key input means connected to said library controller for inputting a forced unloading request thereto, said library controller issuing the forced recording medium cartridge unloading command in response to said forced unloading request from said key input means.

\* \* \* \* \*

UNITED STATES PATENT AND TRADEMARK OFFICE
CERTIFICATE OF CORRECTION

PATENT NO. : 5,627,696
DATED : May 6, 1997
INVENTOR(S) : Tomi et al.

It is certified that error appears in the above-indentified patent and that said Letters Patent is hereby corrected as shown below:

Column 4, line 4, delete "10" and insert --ten--.

Column 4, line 5, delete "15" and insert --fifteen--.

Column 8, line 26, delete "use" and insert --for use--.

Column 9, line 45, delete "library, apparatus" and insert --library apparatus--.

Column 10, line 41, delete "library," and insert --library--.

Signed and Sealed this

Sixteenth Day of June, 1998

*Attest:*

BRUCE LEHMAN

*Attesting Officer*   *Commissioner of Patents and Trademarks*